April 22, 1969   J. A. KRUSE   3,440,522
CONDUCTIVE PLASTIC OVERLAY FOR TARGET DISPLAY
Filed April 3, 1967   Sheet 2 of 3

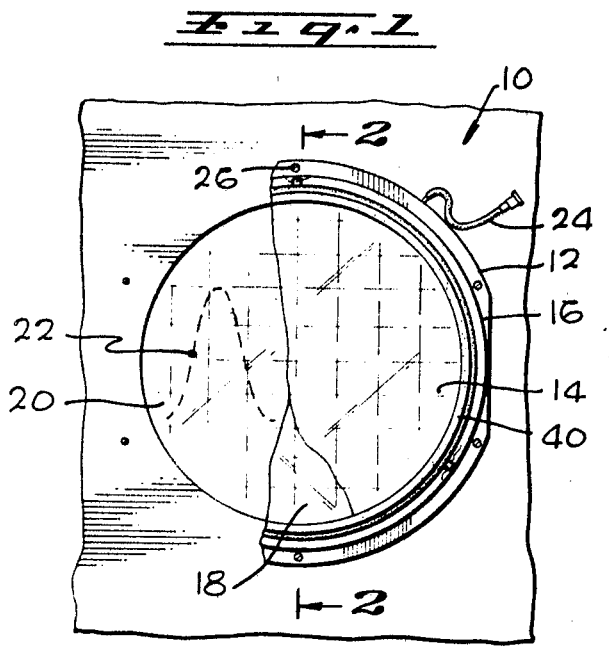
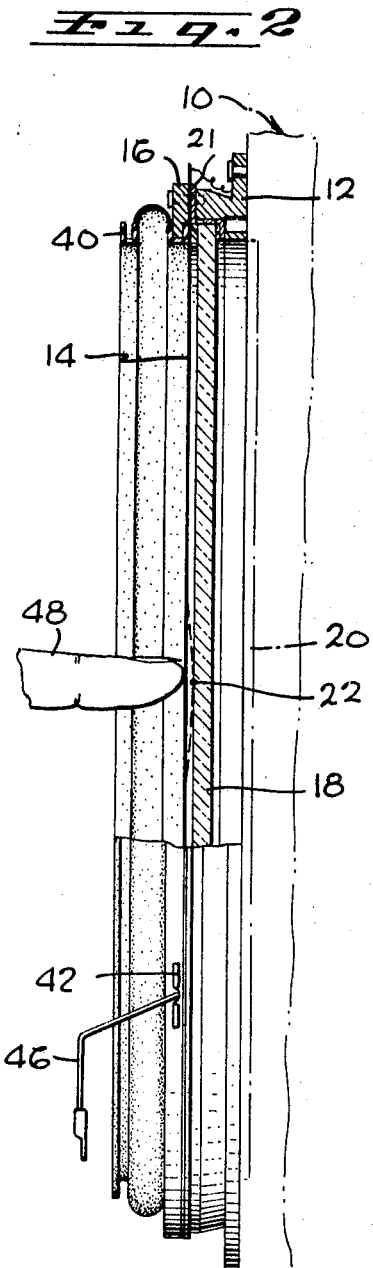
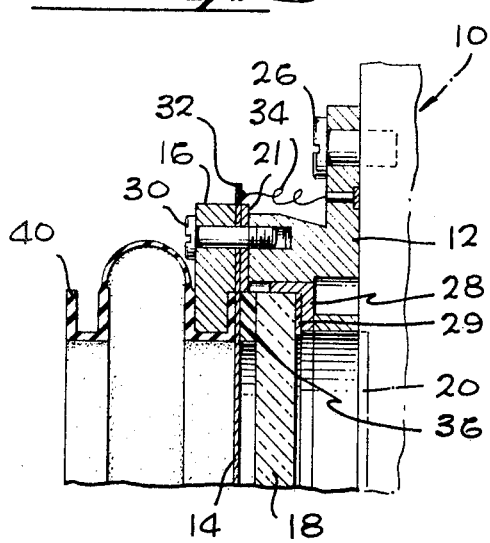

INVENTOR.
JAMES A. KRUSE
BY Frederic P. Smith
ATTORNEY

JAMES A. KRUSE
INVENTOR.

BY Frederic P. Smith
ATTORNEY

United States Patent Office 3,440,522
Patented Apr. 22, 1969

3,440,522
CONDUCTIVE PLASTIC OVERLAY FOR
TARGET DISPLAY
James A. Kruse, Woodland Hills, Calif., assignor to Litton Systems, Inc., Beverly Hills, Calif., a corporation of Maryland
Filed Apr. 3, 1967, Ser. No. 628,136
Int. Cl. G01s 9/02
U.S. Cl. 323—63
16 Claims

ABSTRACT OF THE DISCLOSURE

A voltage sensor having a flexible diaphragm selectively deformable for contacting an opposed surface to receive electrical signals corresponding to the location of points of contact in a predetermined coordinate system.

Background of the invention

This device pertains to the art of sensing electrical signals which correspond to the location in a corrdinate system of points forming visual, cursive, or graphic symbols. More particularly, it pertains to the art of sensing electrical signals representative of the location in a coordinate system of visual symbols displayed on a cathode ray tube. The device also pertains to the art of converting cursive writing into electrical signals for transmission to a remote receiver capable of reproducing the writing and to the art of converting graphic material into electrical signals for processing by a digital computer or other electronic equipment. In the latter art, for example, a hand-drawn sketch may be converted into electrical signals which in turn may be stored on magnetic tape, recorded on microfilm, or virtually simultaneously, reconverted to a visual presentation on a cathode ray tube so that an artist or draftsman may review the sketch.

The technique of "touching" a target displayed on a CRT radar screen with a conductive pencil is a method of target acquisition well known in the art. This method of target acquisition permits a radar to lock-on and track a selected target. In this type of target acquisition, a transparent, conductive glass sheet is positioned over a radar screen and is excited by source voltages so that predetermined voltage gradients are created. The conductive glass comprises a glass sheet having a uniform coating of a conductor such as tin oxide. Touching the conductive glass with a conductive pointer at the target location permits measurement of the voltage gradients existing between the target location and the source voltages. These voltage gradients are analog signals which correspond to the coordinates of the target location. The analog signals are commonly used to generate a target acquiring signal which is also displayed on the screen of the cathode ray tube. To achieve lockon to a target the operator superimposes the target acquiring symbol over the target by moving the conductive pencil across the conductive glass overlay. After a device of this type has been in operation for a period of time difficulty is experienced in locking-on to a target at all points on the radar screen. Investigation has revealed the existence of scratches in the conductive tin oxide coating on the glass. Contact between the conductive pencil at a point on the glass where there is no surface coating fails to develop on output voltage for that point. It has been determined that such scratches are caused by fine silicaceous dust particles which settle on the conductive glass. As the hard dust particles are drawn across the surface of a glass by a target acquiring pencil during normal usage or by cleaning rags, they scratch through the surface coating.

Summary of the invention

The present invention overcomes the above and other disadvantages of the voltage sensing devices of the prior art by providing a deformable membrane which, in one embodiment of the invention, is positioned over a conductive glass thereby completely protecting the coated glass from dust particles while, nevertheless, permitting complete freedom to contact the conductive glass for receiving voltages representative of the location in a coordinate system of points on the conductive glass. More specifically, the voltage sensor of the invention employs a deformable membrane positioned over an opposing spaced surface of a conductive glass for contacting any one of a plurality of points on the opposing surface upon the application of pressure to a corresponding point on the membrane and for receiving from the opposing surface voltages representative of the location in a coordinate system of the point of contact.

In a preferred embodiment of the invention the voltage sensor comprises a circular, transparent, deformable, conductive membrane bonded between an insulating retainer ring and a spacer ring. The conductive membrane comprises a plastic membrane having a thin coating of gold on one side. The surface of the membrane having the conductive coating is positioned over an opposing spaced conductive glass. Voltages representative of the coordinates of points on the surface of the conductive glass are applied to those points. These voltages are established at points in the surface of the glass by utilizing a surface coating having predetermined resistance characteristics which is excited by source voltages applied to points on the periphery of the surface coating. The excitation of such a surface coating creates equipotential lines, i.e. results in predetermined voltage gradients per unit distance, throughout the conductive surface. The application of source voltages to the periphery of the glass is accomplished in a manner which establishes voltages at each point on the surface which are representative of the location of that point in a rectangular coordinate system. An operator may measure the coordinates of any visual symbol viewed through the conductive glass by applying pressure to the deformable membrane to contact the conductive glass. Upon contact between the membrane and the glass, voltages present at the region of contact on the conductive glass will be received by the conductive membrane. The potential differences between the voltage received by the membrane and the source voltages, respectively, are representative of the location of the region of contact in the rectangular coordinate system. In this embodiment the space between the conductive glass and the conductive membrane is sealed from the atmosphere to prevent the entrance of dust particles.

It is, therefore, an object of the invention to provide deformable membranes which sense voltage present at points on an opposing spaced surface.

Brief description of the drawings

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

FIG. 1 is a fragmentary front view of one form of voltage sensor, according to the invention, illustrating the basic element thereof;

FIG. 2 is a side elevation, partly in section, taken on line 2—2 of FIG. 1;

FIG. 3 is an enlarged fragmentary cross-section of the invention;

Description of the preferred embodiments

Figure 4:
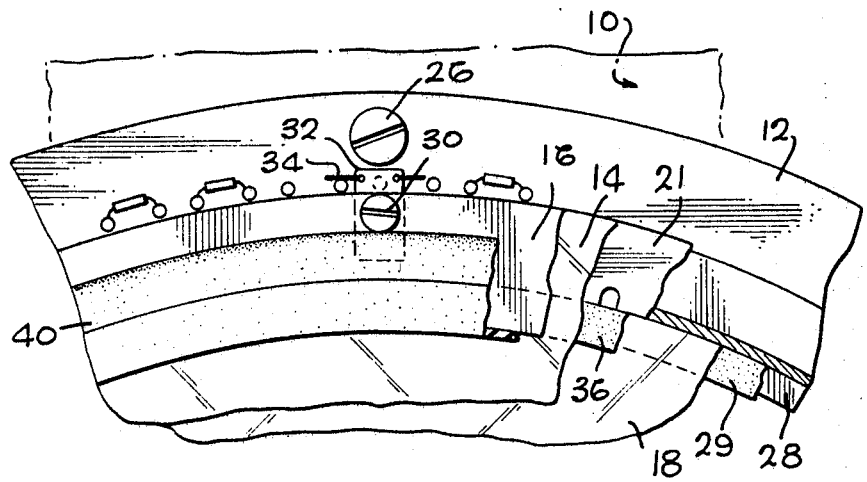
FIG. 4 is a fragmentary front elevation of the invention broken away for clarity.

With reference now to the drawings, wherein like or corresponding parts are designated by the same reference characters throughout the several views, there is shown in FIG. 1 and in FIG. 2 a voltage sensor overlaying a conductive glass and a CRT radar screen which permits complete freedom in contacting the conductive glass at any point while protecting the conductive glass from scratching. Basically, the voltage sensor of the invention shown herein includes five elements, a retainer ring 12 which is fitted over CRT radar screen 20 and mounted on radar display indicator 10, a conductive glass 18 which is held by retainer ring 12, a spacer ring 21, a second retainer ring 16 which is mounted on retainer ring 12 and a conductive diaphragm 14 which is bonded between retainer ring 16 and spacer ring 21.

Conductive diaphragm 14 comprises a thin, deformable plastic membrane having a metal coating. Several considerations are pertinent to the selection of a material for the membrane and a metal for the coating of the membrane. The following considerations relative to the membrane material led to the choice of a polyethylene terephthalate, such as Type D Mylar having a thickness of 5 mils and a noble metal such as gold. The transmissibility of the membrane should be very high. More particularly, it should be capable of transmitting the bandwidth of frequencies which is emitted by the desired light source. The material chosen for the membrane should be resistive to fire. Preferably, it should be self-extinguishing when exposed to flame. The membrane should also be rugged enough to withstand normal use. The material of the membrane should be relatively chemically inert so that it will not be adversely affected by common cleaning solutions and solvents. Vacuum deposited metal should satisfactorily adhere to the membrane so that metal particles are not transferred to the conductive glass 18 during usage. The membrane should operate successfully over a wide range of temperature and humidity levels.

A choice of a metal coating for the membrane may be made according to considerations for galvanic corrosion, transmissibility of light, resistivity of the surface coating and adhesion of the surface coating to the membrane. Galvanic corrosion problems are substantially avoided by the use of noble metals. Among the noble metals, gold has the best optimum characteristics of transmissibility, resistivity and adhesion. A very thin layer of gold may be deposited on the surface of the membrane. After deposition of the metal on the membrane, the transmissibility of the conducting diaphragm 14 should be very high at the wave length of the light source to be utilized. The maximum allowable resistivity of the conductive coating is basically a function of the characteristics of the equipment to which a conductive diaphragm might be coupled. A simple test to determine whether the metal coatings satisfactorily adhere to the membrane may be made by allowing the coating to oxidize at ambient temperature conditions for approximately 10 days after deposition and then rubbing the coating with a finger. The gold coating should not be easily removed by such rubbing. The coated membrane may be of 81–E Electrically Conducting Coating, available from the Liberty Mirror Division of Libbey-Owens-Ford Glass Company, or similar metal coating available from other manufacturers known in the field of vacuum deposition.

Retainer rings 12 and 16 and spacer rings 21 are fabricated from an insulating material such as fiber glass. The material selected for retainer ring 16 should be sufficiently rigid so that it will maintain its shape when a conductive membrane is stretched tautly across it. The inner and outer diameters of retainer rings 12 and 16 are chosen so that retainer ring 12 overlays CRT radar screen 20 and mounts on radar display indicator 10 while retainer ring 16 overlays and mounts on retainer ring 12. Spacer ring 21 has substantially the same inner and outer diameters as retainer ring 16. In the embodiment shown in FIG. 4, spacer ring 21 has a more narrow width than does retainer ring 16. Thus a gasket may be held between retainer ring 16 and conductive glass 18 without substantially increasing the spacing between them.

Conductive diaphragm 14 is stretched across retainer ring 16 in a manner which permits the application of pressure to diaphragm 14 for contacting conductive glass 18 but which prevents diaphragm 14 from sagging excessively. Excessive sagging would result in undesired contact with conductive glass 18. Also, care should be taken that diaphragm 14 is not so tautly stretched across retainer ring 16 so that an operator would become fatigued by repeatedly depressing diaphragm 14. An assembly having these characteristics may be constructed by bonding conductive diaphragm 14 to retainer ring 16. Conductive diaphragm 14 is stretched across retainer ring 16 by pulling outwardly and evenly from a number of equidistant points around its circumference. As seen in FIG. 3 and FIG. 4 conductive diaphragm 14 is held between retainer ring 16 and spacer ring 21. Conductive diaphragm 14, retainer ring 16 and spacer ring 21 have equal outside diameters. Retainer ring 16 also has a protrusion not in contact with diaphragm 14 which in this embodiment is used to engage protective dust hood 40. An electrical connection to conductive diaphragm 14 may be made by inserting a shim between the conductive surface of diaphragm 14 and spacer ring 21. For example, terminal 32 may be inserted during the assembly process.

Figure 5:
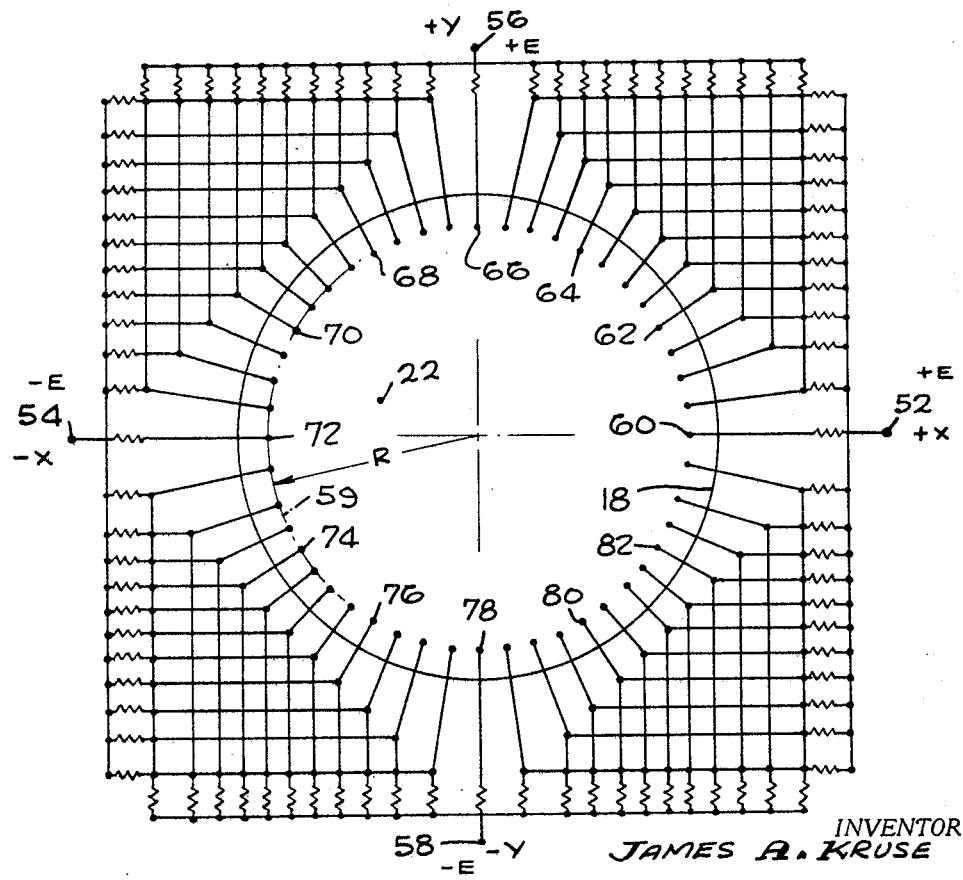
FIG. 5 is a schematic diagram showing the application of source voltages to a conductive glass.

With reference once again to FIG. 2, it will be seen that condutcive glass 18 overlays CRT radar screen 20. Conductive glass 18 is transparent so that "targets" on CRT radar screen 20 may be viewed through it. It also has a surface coating such that, when voltages are applied to points on conductive glass 18, as shown in FIG. 5, there exists voltages at a plurality of points on the conductive surface which correspond to the location of these points in a coordinate system. A conductive glass having such characteristics is obtained by depositing a metallic oxide on a pane of ordinary glass. The metallic oxide is deposited in a pattern having predetermined resistivity characteristics. Conductive glass 18 may be of Electrapane, made by the Liberty Mirror Division of Libbey-Owens-Ford Glass Company, or other similar material of predetermined conductivity. In this embodiment, the conductive surface coating of conductive glass 18 has a substatnially uniform surface resistivity per square. The application of a voltage to the surface of conductive glass 18 at terminals 66 and 78, as shown in FIG. 5, creates a constant voltage gradient along a substantially straight line between terminals 66 and 78. The voltage difference between a point along such a line and terminals 66 and 78, respectively, corresponds to the location of that point along the line.

In FIG. 3 and FIG. 4 it is seen that conductive glass 18 is held in place over CRT radar screen 20 by retainer ring 12, conductive glass 18 resting on a protruding inner rim of retaining ring 12. In order to prevent dust and other particles from entering the space between conductive glass 18 and conductive diaphragm 14, gasket 28 is employed between conductive glass 18 and retainer ring 12. Conductive glass 18 is held in place by retainer ring 16. Gasket 36, which is held in place between retainer ring 16 and conductive glass 18, is used to substantially seal that interface from undesired particles. A plurality of screws such as screw 30 may be spaced around the circumference of retaining ring 16 to hold retaining ring 16 against retaining ring 12. Retaining ring 12 may likewise be held in place by a plurality of screws such as screw 26 spaced around the circumference of retaining ring 12.

Referring now to FIG. 5, there is shown a conductive glass 18 having a number of terminals affixed to it. A rectangular coordinate system is shown consisting of an X axis joining terminals 72 and 60 and a Y axis joining terminals 78 and 66. As it is desired to establish voltages at points on the surface of conductive glass 18 representative of the location of the points in the assumed coordinate system, voltages may be applied to a number of discrete points on the surface of the glass having the locus of a circle passing through terminals 60, 66, 72 and 78. For example, the application of voltages +E and —E (voltage sources not shown) to terminals 66 and 78 respectively, would establish a uniform voltage gradient along the Y axis joining those points. Likewise, the application of voltages +E and —E to terminals 60 and 72 respectively, would result in a uniform voltage gradient along the Y axis joining those terminals. The desired potentials at points on the surface corresponding to the locations of the points in the coordinate system are expressed as:

$$\frac{E \cdot x}{R} \text{ and } \frac{E \cdot y}{R}$$

where E is the source voltage, $x$ is the length of the abscissa of a point, $y$ is the ordinate of that point, and R is the radius of circle 59 passing through terminals 60, 66, 72 and 78. These potential fields are established on the surface of the glass by applying at discrete points along the circle 59, X voltages which vary with a cosine function and Y source voltages which vary with a sine function. The X, Y source voltages to be applied to any selected point on the circle 59 may be determined from the expression:

$$\nu_x = E \cos \theta \text{ and } \nu_y = E \sin \theta$$

where E is the source voltage and $\theta$ is the angle defined by a line joining the chosen point on the circle 59, the origin O of the coordinate system and terminal 60 on the X axis. A number of discrete points on the circle 59 are chosen as, for example, the 48 points shown in FIG. 5. Respective voltages levels are calculated from the location of these points by utilizing the formulas for $\nu_x$ and $\nu_y$. Application of the calculated voltage to the 48 points will establish the desired potential fields $E \cdot x/R$ and $E \cdot y/R$. The calculated voltage levels may be obtained, for example, by applying source voltages to a resistor voltage dropping network. Terminals may be affixed to conductive glass 18 by one of several methods well known in the art. For example, silver filled epoxy may be used to couple electrical leads to conductive glass 18.

In operation the voltage sensor of FIG. 2 of the invention permits measurement of the locations of points on a surface in a coordinate system by contacting the surface to receive voltages representative of the location of the points. Source voltages are applied to the conductive surface of conductive glass 18 in the manner shown in FIG. 5. The application of the source voltages establishes a voltage at each point on the conductive surface representative of the location of that point in a rectangular coordinate system. Referring again to FIG. 2, conductive diaphragm 14 is shown overlaying conductive glass 18 so that their conductive surfaces oppose one another. A correspondence exists between each point on the surface of conductive glass 18 and a point on the opposing surface of conductive diaphragm 14. Conductive diaphragm 14 is deformable for establishing contact between corresponding points on the two surfaces. An operator may establish contact between the two surfaces by applying pressure to conductive diaphragm 14 with a finger 48, as shown in FIG. 2, or with a probe. When a region of contact is established between the conductive surfaces of conductive glass 18 and conductive diaphragm 14, the voltage present on conductive glass 18 is received throughout conductive diaphragm 14. Terminal 32 which is connected to the conductive surface of conductive diaphragm 14 makes a voltage available for transmittal to external equipment. The voltage differences between the voltage existing at the region of contact between the two surfaces and the source voltages respectively, are representative of the location of the region of contact in the coordinate system.

Figure 6:
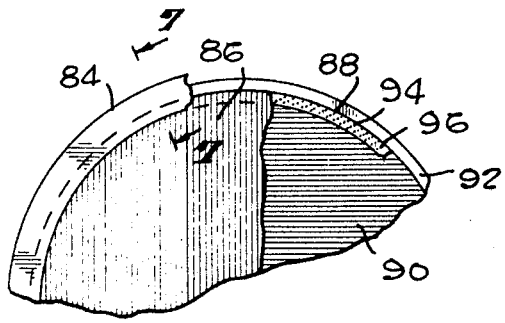
FIG. 6 is a diagrammatic front elevation, partially broken away, showing a second form of voltage sensor.
Figure 7:
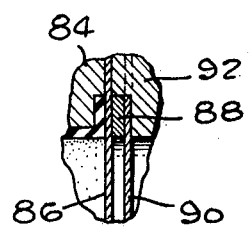
FIG. 7 is a section taken on line 7—7 of FIG. 6.

Referring now to FIG. 6 and FIG. 7, there is shown still another voltage sensor which comprises two opposed deformable membranes each having conductive surface regions of closely spaced conductive grid lines. A first membrane 86 is tautly held between a first retainer ring 84 and a spacer ring 88. A second membrane 90 is tautly held between spacer ring 88 and a second retainer ring 92. First membrane 86 and second membrane 88 have narrowly spaced conductive grid lines separated from one another by insulating surface areas. Membrane 90 is positioned with respect to membrane 86 so that the grid lines of the two membranes are in quadrature with respect to one another.

In operation the voltage sensor of FIG. 6 permits measurement of the location in a coordinate system of corresponding points on a pair of opposing surfaces by employing each of a pair of opposing conductive grids alternately as a data carrying grid and as a voltage sensor. Voltages representative of the coordinate of each grid line in a coordinate system are alternately applied to the grid lines of first membrane 86 and second membrane 90. Pressure applied to second membrane 90 will establish contact between corresponding points on the surface of second membrane 90 and first membrane 86. When contact is established in a region, a voltage present on a conductive line of one membrane will be received by a conductive grid line on the other membrane. Since source voltages are alternately applied to membranes 86 and 90, contact between the two membranes will result in each membrane alternately receiving from the other membrane a voltage representative of the location of the region of contact in a coordinate system.

Figure 8:
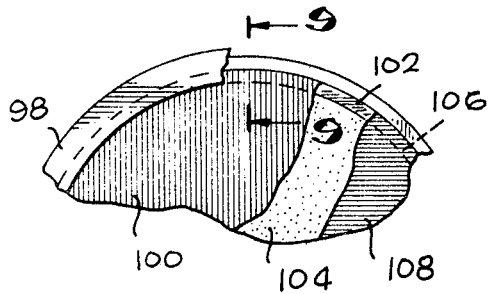
FIG. 8 is a diagrammatic front elevation, partly broken away, showing a third form of voltage sensor.
Figure 9:
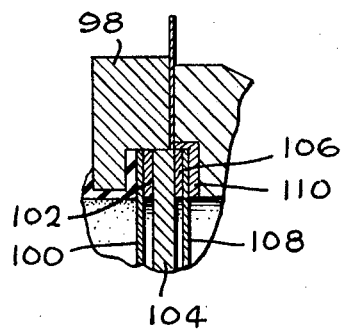
FIG. 9 is a section taken on line 9—9 of FIG. 8.

Referring now to FIG. 8 and FIG. 9, there is shown yet another voltage sensor which comprises three deformable membranes wherein conducting surfaces of a center membrane are opposed by conductive grid lines on the outer membranes. A first deformable membrane 100 is tautly held between a first retainer ring 98 and a first spacer ring 102. Similarly, a second membrane 104 is tautly held between first spacer ring 102 and second spacer ring 106. Likewise, a third membrane is tautly held between second spacer ring 106 and second retainer ring 110. First membrane 100 and third membrane 108 have conductive surface regions comprising narrowly spaced conductive grid lines separated from one another by insulating surface areas. Third membrane 108 is oriented with respect to first membrane 100 so that the grid lines of these two membranes are in quadrature with respect to one another.

In operation the voltage sensor of FIG. 8 permits measurement of the location in a coordinate system of corresponding points on a pair of opposed surfaces by employing a pair of opposing conductive grids as data carrying surfaces and the conductive surfaces of an intermediate membrane as voltage sensors. Voltages representative of the coordinate of each grid line in a coordinate system are simultaneously applied to the grid lines of first membrane 100 and third membrane 108. Pressure applied to third membrane 108 will establish contact between corresponding points on the surfaces of third membrane 108 and on the surface of second membrane 104 and will also establish contact between corresponding points on the other surface of second membrane 104 and points on the surface of first membrane 100. When both regions of contact are established, the voltages present on a conductive line of first membrane 100 and third membrane 108 will be received by the conductive surfaces of second membrane 104 respectively. Since source voltages are simultaneously applied to membranes 100 and 108, contact between the three membranes will result in the conductive surfaces of second membrane 104 each receiving a voltage from a grid line representative of the location of one coordinate of the region of contact in a coordinate system.

Figure 10:
FIG. 10 is a simplified schematic of a typical voltage divider network for developing source voltages.

Any one of a number of methods could be employed to apply predetermined voltages to each grid line of the embodiments shown in FIG. 6 and FIG. 8. For example, FIG. 6 shows terminals 94 and 96 which are each connected to a grid line of second membrane 90. In FIG. 10 there is shown a voltage divider network for developing predetermined voltages to be applied to grid lines by means of terminals such as terminals 94 and 96 of FIG. 6.

It will, of course, be recognized that numerous other modifications and alterations may be made in the voltage sensors herein disclosed without departing from the spirit or scope of the invention. As shown in FIG. 8, for example, instead of employing conductive grids on membranes 100 and 108, the opposing conductive regions of membranes 100 and 104 and membranes 104 and 108 respectively, could be reverse so that the conductive grids would be back to back on the surfaces of the second membrane 104.

I claim:

1. A voltage sensor comprising:
   a pair of elements positioned to have opposing spaced surfaces, at least one element being deformable, a plurality of points on said surface of one element corresponding respectively to a plurality of points on said surface of the other element, said one element being responsive to the selective application of pressure to a plurality of points thereon for deforming to contact the corresponding point on the surface of said other element;
   means for applying voltages to at least a first one of said surfaces for presenting at each of a plurality of points thereon a voltage representative of at least one coordinate of the location of such point in a predetermined coordinate system; and
   means electrically coupled to at least one of said surfaces and responsive to said contact between said surfaces for sensing the voltage existing at the region of contact.

2. A device as claimed in claim 1 wherein each of said surfaces has a predetermined pattern of resistivity.

3. A device as claimed in claim 1 wherein each of said surfaces is conductive in predetermined regions.

4. A device as claimed in claim 1 wherein one said surface is conductive throughout.

5. A device as claimed in claim 1 wherein one surface has a predetermined pattern of resistivity and the other surface is conductive in predetermined regions.

6. A device as claimed in claim 1 wherein each said elements including said surface is substantially transparent.

7. A device as claimed in claim 1 wherein said means for applying voltages is coupled to one of said surfaces and said means responsive to a contact between said surfaces for sensing the voltage existing at the region of contact is electrically coupled to the other said surface.

8. A device as claimed in claim 1 wherein at least one element comprises a deformable film of polyethylene terephthalate having a surface coating which is conductive in predetermined regions.

9. A voltage sensor comprising:
   an element having predetermined surface regions of predetermined resistivity;
   a deformable membrane having predetermined surface regions of predetermined resistivity, said surface regions positioned to oppose the surface regions of said element, a plurality of points on said surface regions of said membrane corresponding respectively to a plurality of points on said surface regions of said element, said membrane being responsive to the selective application of pressure to a plurality of points thereon for deforming to contact the corresponding point on said surface regions of said element;
   means for applying voltages to said predetermined surface regions of said element for presenting at each of a plurality of points thereon voltage representative of the location of such point in a predetermined coordinate system; and
   means electrically coupled to said predetermined surface regions of said membrane and responsive to said contact between said surface regions for sensing the voltage existing at the region of contact.

10. A device as claimed in claim 9 wherein said membrane and said element are substantially transparent.

11. A voltage sensor comprising:
    an element having predetermined surface regions of predetermined resistivity;
    a deformable first membrane having predetermined surface regions of predetermined resistivity, said predetermined surface regions on said first membrane positioned to oppose the predetermined surface regions on said element, a plurality of points on said surface regions on said first membrane corresponding respectively to a plurality of points on said surface regions of said element, said membrane being responsive to the selective application of pressure to a plurality of points on said first membrane for deforming to contact the corresponding point on said surface regions of said element;
    means for applying voltages to said predetermined surface regions of said element and to said surface regions of said first membrane for presenting at each of a plurality of points thereon a voltage representative of at least one coordinate of such point in a coordinate system; and
    means electrically coupled to said predetermined surface regions of said element and to said surface regions of said membrane and responsive to said contact between said surface regions for sensing the voltage existing at the region of contact.

12. A device as claimed in claim 11 wherein said first membrane and said element are substantially transparent.

13. A device as claimed in claim 11 wherein said element comprises a second membrane.

14. A voltage sensor comprising:
    an element having predetermined regions of predetermined surface resistivity on a first surface;
    a deformable first membrane having regions of predetermind surface resistivity on a second and on a third surface, said surface regions on said second surface positioned to oppose the conductive surface regions on said first surface of said element, a plurality of points on said surface regions of said second and third surfaces on said first membrane corresponding respectively to a plurality of points on said surface regions on said first surface of said element, said first membrane being responsive to the selective application of pressure to a plurality of points thereon for deforming to contact the corresponding points on said surface regions of said element;

a deformable second membrane having predetermined surface regions of predetermined surface resistivity on a fourth surface, said surface regions on said fourth surface positioned to oppose the surface regions of said third surface on said first membrane, a plurality of points on said surface regions of said fourth surface on said second membrane corresponding respectively to a plurality of points on said surface regions of said first, second, and third surfaces, said second membrane being responsive to the selective application of pressure to a plurality fo points thereon for deforming to contact the corresponding points on said surface regions on said third surface of said second membrane;

means for applying voltages to the predetermined surface regions of at least two of said first, second, third and fourth surfaces for presenting at each of a plurality of points thereon a voltage representative of at least one coordinate of the points in a coordinate system; and means electrically coupled to said predetermined surface regions of at least two of said first, second, third and fourth surfaces and responsive to said contact between said surface regions for sensing the voltage existing at the region of contact.

15. A device as claimed in claim 14 wherein said element comprises a third membrane.

16. A voltage sensor comprising:
a cathode ray tube having predetermined surface regions of predetermined resistivity;

a deformable membrane having predetermined surface regions of predetermined resistivity, said surface regions positioned to oppose the surface regions of said cathode ray tube, a plurality of points on said surface regions on said membrane corresponding respectively to a plurality of points on said surface regions on said cathode ray tube, said membrane being responsive to a selective application of pressure to a plurality of points thereon for deforming to contact the corresponding point on said surface regions on said cathode ray tube;

means for applying voltages to said predetermined surface regions on said cathode ray tube for presenting at each of a plurality of points thereon a voltage representative of the location of such point in a predetermined coordinate system; and means electrically coupled to said predetermined surface regions of said membrane and responsive to a contact between said surface regions for sensing the voltage existing at the region of contact.

References Cited

UNITED STATES PATENTS

| | | | |
|---|---|---|---|
| 2,364,728 | 12/1944 | Luce | 338—96 |
| 2,849,707 | 8/1958 | White. | |
| 2,891,244 | 6/1959 | Pastoriza | 343—7.3 |
| 3,102,926 | 9/1963 | Fluhr et al. | |
| 3,106,707 | 10/1963 | Thompson | 343—7.3 |
| 3,217,320 | 11/1965 | Di Perry | 343—7.3 |

JOHN F. COUCH, *Primary Examiner.*

W. H. BEHA, *Assistant Examiner.*

U.S. Cl. X.R.

323—96; 343—7.3